Figure 1:
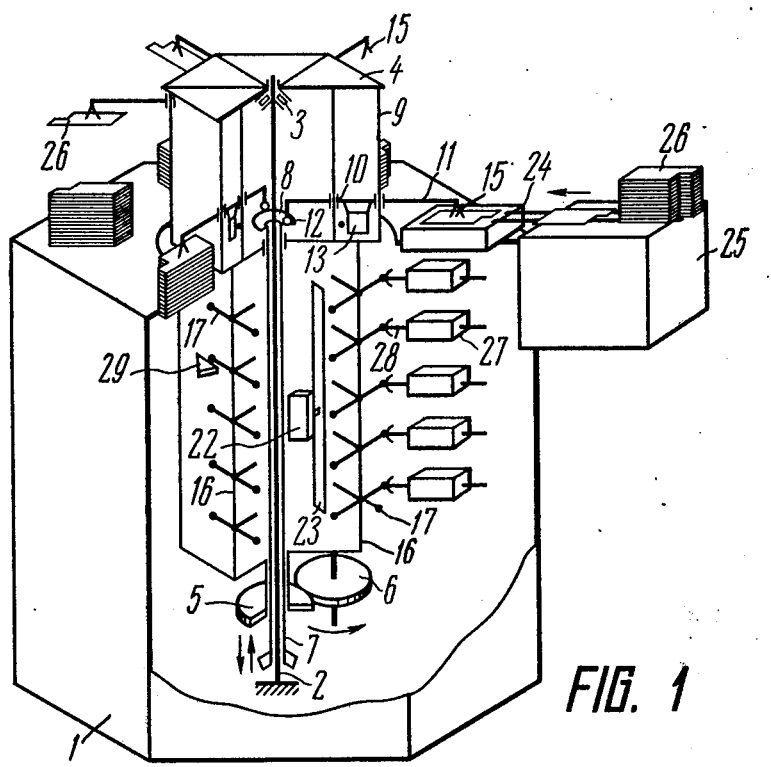

United States Patent [19]

Kolosov

[11] 4,132,313

[45] Jan. 2, 1979

[54] AUTOMATIC DEVICE FOR SORTING FLAT ARTICLES

[76] Inventor: Ivan A. Kolosov, ulitsa Astrakhanskaya, 118, kv. 54, Saratov, U.S.S.R.

[21] Appl. No.: 814,276

[22] Filed: Jul. 11, 1977

[51] Int. Cl.² .............................................. B07C 5/04
[52] U.S. Cl. ...................................... 209/560; 271/4; 271/64; 214/6 FS; 214/11 R
[58] Field of Search .................. 209/71, 72, 73, 74 R, 209/74 M, 82; 271/3, 4, 5, 64; 214/6 FS, 11 R, 11 C

[56] References Cited

U.S. PATENT DOCUMENTS

| 3,041,065 | 6/1962 | Kretz | 271/5 X |
| 3,416,658 | 12/1968 | Goller et al. | 209/74 R |
| 4,067,459 | 1/1978 | Rozengauz et al. | 209/111.7 R X |

FOREIGN PATENT DOCUMENTS

| 1292576 | 4/1969 | Fed. Rep. of Germany | 209/74 M |
| 482213 | 8/1975 | U.S.S.R. | 209/74 M |

Primary Examiner—Joseph J. Rolla
Attorney, Agent, or Firm—Lackenbach, Lilling & Siegel

[57] ABSTRACT

An automatic device for sorting flat articles comprises a casing with a vertical sorting drum in the center, said drum being provided with posts arranged around the periphery of said drum which are intermittently turned by a drive. Each post has a manipulator sliding freely over said post and having a catch for fixing said manipulator in the uppermost position. The sorting drum is provided with a memory unit with memory cells, each of said cells being made in the form of a group of arms controlled by electromagnets of an actuating mechanism and assembled on a vertical axle under each of said posts, the number of said arms corresponding to the number of flat articles to be sorted and stops, said stops being installed on each sorting position level with said arm which corresponds to the number of the sorted group, each catch being controlled by any one arm of the memory cell of the memory unit, thereby ensuring the distribution of the sorted flat articles in piles around the periphery of said casing in accordance with the parameters of said articles to be sorted.

2 Claims, 2 Drawing Figures

AUTOMATIC DEVICE FOR SORTING FLAT ARTICLES

The present invention relates to the manufacture of storage batteries and more particularly it relates to an automatic device for sorting flat articles, mainly battery electrode plates, by thickness, weight, etc. for selective assembly of electrodes.

The automatic device for sorting flat articles according to the invention is designed for use in automatic lines for selective assembly of electric storage batteries but can also be employed advantageously for sorting articles of any shape by weight, thickness, length and other parameters and for distributing them into corresponding cassettes.

The automatic device according to the invention can be used most successfully for sorting electrodes, and for automating the selective assembly in the manufacture of storage batteries with a high specific power capacity made of extra-thin electrode plates with a low stiffness, for example storage batteries used in aircraft, in battery-powered cars, etc., where the electrodes are sorted out manually.

The problem of automating the assembly of such storage batteries lies in that the cell groups of batteries with a high specific power capacity must fit with a preset tightness into the jar which is assured by selecting the electrodes of a required thickness to ensure the preset thickness of the group at a given number of plate electrodes.

Inasmuch as the thickness of the manufactured electrodes varies within wide limits, said electrodes are sorted into groups in advance. Moreover, the baked blank strips are calibrated before soaking though this reduces the porosity of the strips and reduces the specific capacity of the electrode.

In the prior art sorting devices the parts usually fall into the hoppers of the various groups, but this is not possible for sorting out thin, low-strength electrodes since it would cause their deformation and require additional manual labor for picking out the electrodes heaped in disorder in the hoppers.

Therefore, the electrodes of the batteries with a high specific power capacity are sorted in the USSR and in foreign companies mainly by hand on technical balances or with the air of thickness-measuring instruments, e.g. micrometers, followed by distributing the electrodes manually into piles belonging to different groups.

Also known in the prior art is an automatic device for checking and sorting articles by their linear dimensions comprising a measuring instrument with an actuating mechanism, a sorting drum with memory cells in the form of arms receiving the signals of said actuating mechanism, said drum being turned by a drive around its axis from one position to another, a disc carrier rotating in synchronism with the drum, and a sorter in the form of an axially spring-loaded rod provided with a stop which interacts with the corresponding memory cell on the drum. Said drum is installed on a shaft and is capable of moving axially, thereby pushing out the measured part into a tray, to a position corresponding to its size. In this device the parts to be sorted are loaded into a slot of the disc carrier. In the next position the dimensions of the electrode are measured for which purpose the electromagnet of the actuating mechanism is energized and pushes out the stop. As the drum reciprocates along the shaft, the arm of the memory cell meets this stop and is shifted to another fixed position wherein a given article is discharged by the sorter into the tray in the appropriate position.

This prior art device has the following disadvantages.

This device provides for sorting the parts into only two groups.

In the above-described design the number of sorted groups cannot be increased because the arm of the memory cell has only two positions, in one of which the article is unloaded by the sorter whilst in the other one it is unloaded either by a pusher or under its own weight. Besides, the disc carrier can be used only for conveying the articles resembling in shape the bodies of revolution (rollers, balls, rings, etc.).

Flat parts, such as battery plates, cannot be sorted by this device.

Furthermore, in this device the measured articles are unloaded into trays and hoppers in bulk which is unacceptable for thin low-strength battery plates.

All the above-mentioned disadvantages prevent this device from being used for sorting thin low-strength battery plates or other flat articles.

An object of the present invention is to provide an automatic device for sorting flat articles, particularly battery plates, which would ensure sorting of flat articles, distributing them into the corresponding groups and placing them into cassettes.

Another object of the invention, is to improve the reliability of the device without detriment to its efficiency.

These objects are accomplished by providing an automatic device for sorting flat articles, mainly battery electrodes for selective assembly of plate groups, comprising a casing with a vertical sorting drum in the center, said drum being provided with posts arranged around the periphery of the drum which are intermittently turned by a drive and has a memory unit with memory cells in the form of arms interacting with an actuating mechanism, and a control instrument transmitting a signal to the memory cells via said actuating mechanism. According to the invention, each post is provided with a manipulator free-sliding over said posts and having an electromagnetic catch for locking the manipulators in the uppermost position. Each memory cell of the memory unit is made in the form of a group of arms, controlled by the electromagnets of an actuating mechanism and assembled on a vertical axle under each pair of posts, the number of said arms corresponding to the number of the sorted groups of plates, and of stops, installed on each sorting position, level with the arm corresponding to the number of the group being sorted. Each catch is controlled by any arm of the memory cell of the memory unit thereby placing the sorted articles in piles around the periphery of the casing in accordance with the parameters of the articles to be sorted.

The automatic device for sorting flat articles according to the present invention ensures sorting of extra-thin low-strength battery plates in order to automate the selective assembly of a group of battery plates with a preset tightness of fitting of the group into the jar, and at the same time raises the efficiency and reliability of the automatic devices and the accuracy of checking the parameters during sorting which is accomplished by providing a sorting drum with free-sliding manipulators having a catch for fixing each manipulator in the uppermost position. Further, each manipulator has a memory cell of the memory unit made in the form of a group of arms whose number corresponds to that of the groups being sorted, each arm actuating the catch on a signal sent from the actuating mechanism of the control instrument and each sorting position is provided with a stop installed at the level of the memory cell arm corresponding to the number of said sorting position thereby automatically measuring the electrode parameter, lifting the electrode from the control instrument and placing said electrode into a replaceable cassette on the position corresponding to its parameter.

The use of free-sliding manipulators with a grip of a magnetic, vacuum or another type which go down on a pile of electrodes under their own weight ensures a minimum pressure on the electrodes regardless of the height of the electrode pile in the cassette.

The simplicity of the memory unit in the form of a group of arms acting on the catch and having a minimum number of wearing parts ensures long life of the automatic device for sorting flat articles, and provides for reliable and accurate sorting of electrodes at a high speed limited only by the time required for measuring the electrode parameter; this guarantees a high efficiency of the automatic device for sorting flat articles.

Automatic distribution of electrodes in cassettes by different groups enables the setting up of an automatic battery assembly line consisting of separate automatic assembly units interconnected by a single cassette; this reduces the expenditures of time and work for in-process conveyance of electrodes.

Figure 2:
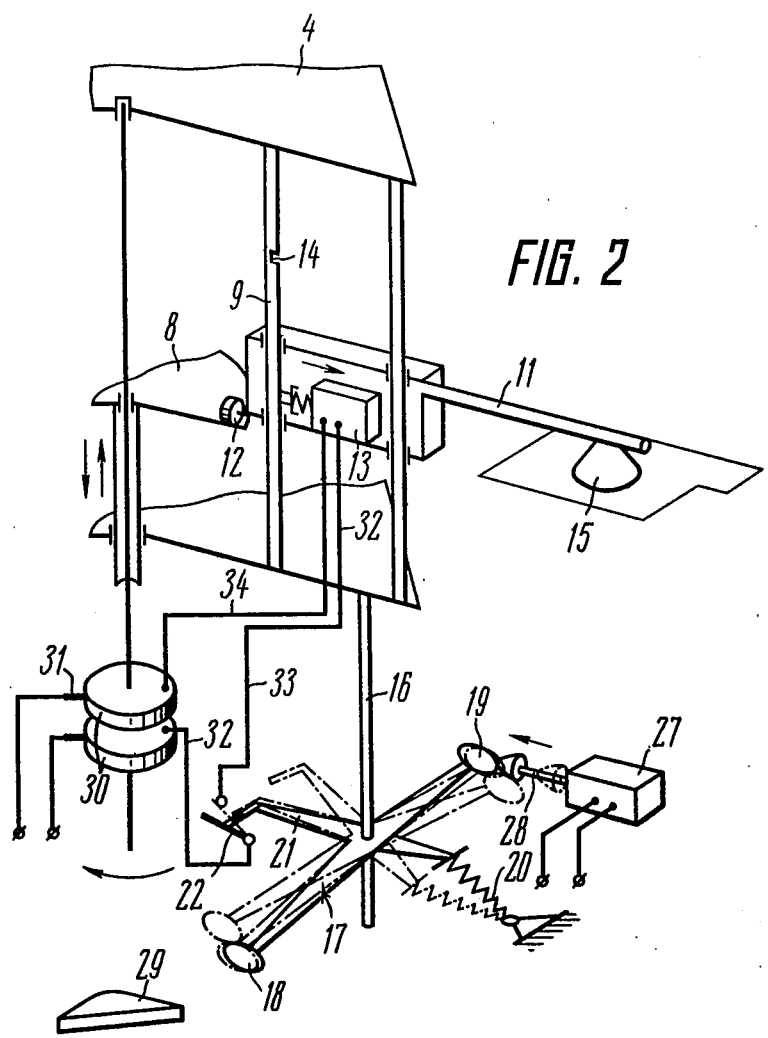

Now the invention will be described in detail by way of example with reference to the accompanying drawings in which:

FIG. 1 is a prespective general view of the automatic device for sorting flat articles; and FIG. 2 is a prespective view showing the interaction of the manipulator with the electromagnets of the actuating mechanism and with the memory cell.

Given hereinbelow is an example of realization of the automatic device incorporating a catch with electromagnets.

The automatic device for sorting flat articles according to the present invention comprises a casing 1 (FIG. 1) with a vertical rod 2 installed immovably in the center. Secured to the upper end of the rod 2 is a thrust bearing 3 for mounting a sorting drum 4 on said rod 2. The lower face of the sorting drum 4 has a rigidly fastened gear 5 meshing with a gear 6, the gear 6 being driven (the drive is not shown in the drawing) for turning the drum 4 intermittently from one sorting position to another. The gear 5 is mounted with the aid of a sliding-contact bearing on a tubular sleeve 7 which slides freely over the rod 2 and is reciprocated vertically and periodically by the same drive. The tubular sleeve 7 is provided at the top with a plate 8. The drive lowers and lifts the tubular sleeve 7 and turns the drum 4 in accordance with a preset cycle so that the drum is turned through an angle which divides the circumference of the table of the casing 1 into sorting positions, the number of said positions being equal to the number of the sorted groups plus one (in the given case — six positions for five sorting groups). Installed in pairs, for example, around the periphery of the drum 4 are posts 9 (FIGS. 1 and 2) whose number is equal to that of the sorted groups. Any other structures can be used instead of posts which serve the same purpose. The posts 9 are provided with sliding-contact bearings 10 in which are installed manipulators 11, the manipulators 11 having rollers 12 which rest on the plate 8 of the sleeve 7. The manipulator 11 has a projection protruding from the periphery of the drum 4 and reciprocating jointly with the manipulator 11 and the plate 8 of the sleeve 7 in a vertical direction above the upper surface of the casing 1. Each manipulator 11 has a catch 13 which fixes the manipulator 11 (with the electromagnet deenergized) in a slot 14 (FIG. 2) located on the upper end of one of the posts 9. The projection of each manipulator 11 protruding from the drum 4 carries a grip 15 (FIGS. 1 and 2) which can be of a magnetic, vacuum or some other type.

Mounted in the lower part of the drum 4 above the face surface of the casing 1 opposite each manipulator 11 on a vertical axle 16 is a group of arms 17 constituting the memory cell of the memory unit, the number of the arms being equal to that of the sorted groups.

Each arm 17 has a roller 18 or 19 (FIG. 2) at each end, a servo spring 20 which fixes the arm 17 in one of two extreme positions, and a pressure pin 21 located in the middle of the arm 17 and interacting with a contact 22 via a common strip 23 (FIG. 1), said contact being installed in the supply circuit of the electromagnetic catch 13.

It should be borne in mind that interaction of the catch with the arms of the memory unit can be realized in various embodiments, viz., electromagnetic, electromechanical, mechanical and so on, and it is important that the manipulators be fixed in the uppermost position and lowered under the action of any arm of the respective memory unit.

Installed on one of the positions of the casing 1 is a control instrument 24 located near a device for piece-by-piece release of the electrodes 26 to the control instrument 24. On the same position below the control instrument 24 there is an actuating mechanism comprising electromagnets 27 (FIGS. 1, 2) with pushers 28, whose number is equal to that of the sorted groups, said pushers being arranged at the levels corresponding to the levels of the arms 17 in each section of the memory unit of the drum 4. And each position of the casing 1 has one fixed stop 29 at the level of each arm 17 of the memory unit, corresponding to the number of the sorted group, counting the arms 17 from the top down. In the lower part of the drum 4 there are two electric contact rings 30 (FIG. 2) connected by brushes 31 to a source of power.

The contact 22 is connected with the lower contact ring 30 by a wire 32; it is also connected with the upper contact ring 30 by wires 33 and 34 via the electromagnetic catch 13.

It should be borne in mind that the electromagnetic catch can be made in a variety of forms. In the form shown in FIG. 2 the wires 33 and 34 are movable just as are the cables connected to elevator cabins. The electromagnetic catch 13 can also be fixed relative to the drum 4 (for example, on the upper face of the drum 4) in which case the manipulator 11 is fixed with the aid of a slotted rod installed on said manipulator and passing near the catch. In this layout the wires 33 and 34 will be immovable and, consequently, more durable.

The grips 15 can also vary in shape and construction; for example they may have a permanent electromagnet, an electromagnet, a vacuum cup, etc. But, it is important that the grip 15 lifting the electrode 26 from the control instrument 24 should lower it only after said electrode 26 applies pressure again to the pile located in the sorting position.

The device according to the present invention functions as follows. After measuring the parameter of the electrode 26, e.g. its weight, thickness, linear dimensions, etc. the control instrument 24 (FIG. 1) energizes one of the electromagnets 27 of the actuating mechanism, said electromagnet corresponding to the group of electrodes 26 with respect to the measured parameter. The pusher 28 of the actuating mechanism presses the corresponding arm 17 via rollers 19 (FIG. 2) whilst the arm 17 of the corresponding memory cell of the memory unit is fixed in the depressed position by the servo spring 20. The pressure pin 21 opens the contact 22 of the electromagnetic catch 13 thereby deenergizing it. The catch 13 is pressed against the post 9 and slides over it when the manipulator 11 is raised by the lifting plate 8 of the sleeve 7 via the roller 12. Reaching the uppermost position, the catch 13 snaps into the slot 14, the drum 4 turns to the next position, the plate 8 goes down, the manipulator 11 with the pressed arm 17 stops together with the electrode 26 in the upper position on the grip 15. The next manipulator 11 descends on the control instrument 24, grips and lifts the next electrode 26 and is locked in the upper position by one of the arms 17 of the memory cell in the memory unit of the drum 4. Fixed in the upper position the manipulator 11 with the electrode 26 descends at the position wherein the roller 18 of the pressed arm 17 comes against the stop 29 (FIGS. 1,2) which will press the roller 18 thereby closing again the contact 22. The electromagnetic catch 13 comes out of the slot 14 and, on lowering of the plate 8, the manipulator places the electrode 26 into a pile. At the beginning of the next turn of the drum 4 the roller 18 comes off the stop 29, and the spring 20 returns the arm 17 to the previous position, opening the contact 22. The manipulator 11 is again fixed in the extreme upper position and goes down only at the position of the control instrument 24 wherein there is a common stop (not shown in the drawing) which shifts all the arms 17 to the initial position. Thus, the common drive with a camshaft (not shown in the drawings) executes recurrent motions and performs the sorting operations in the following sequence: loading of the electrode 26 on the control instrument 24, descending of the plate 8 to the downmost position, raising of the plate 8 to the uppermost position, turning of the drum 4 to the next position, repeated lowering of the plate 8, measuring the parameter of the electrode 26 and registering it in the memory unit, stopping of the electrode 26 in the upper position, lowering of the electrode 26 in the position of the given sorted group, repeated stopping of the manipulator 11 in the upper position, its lowering and gripping a new electrode 26 on the control position. The duration of the sorting time depends on the time taken by the downward and upward travel of the plate plus turning of the drum 4 to the next position. All the other operations are performed concurrently.

The automatic device for sorting flat articles according to the present invention ensures automatic sorting of extra-thin low-strength electrodes of the storage batteries with a high specific power capacity because the sorting drum 4 is provided with manipulators 11 which have a catch 13 for fixing each manipulator 11 in the uppermost position, each manipulator 11 incorporating a memory cell of the memory unit made in the form of a group of arms 17 interacting with the catch 13 on a signal generated by the actuating mechanism of the control instrument 24 while each sorting position has a stop 29 acting on the arm 17 in accordance with the sorted group, thus automatically measuring the parameter of the electrode 26, lifting said electrode 26 and lowering it into a replaceable cassette on the position corresponding to the electrode parameter.

The use of the manipulators 11 with the grip 15, both free-sliding over the posts 9 and descending on the pile of electrodes 26 under their own weight, ensures a minimum pressure applied to the electrodes 26 irrespective of the height of the pile of electrodes 26.

The simplicity of the memory unit made in the form of a group of arms 17 and having a minimum number of wearing parts makes for durability of the device, and for reliable and accurate sorting of electrodes at a high speed which is limited only by the measuring cycle of the electrode parameter which guarantees a high efficiency of the device.

Automatic sorting of electrodes of a certain parameter into groups in a cassette provides for objectiveness of control and permits setting up an automatic battery-assembling line consisting of individual automatic assembly units connected by a single cassette thus reducing the expenditures for in-process conveyance of electrodes.

What I claim is:

1. An automatic device for sorting flat articles, such as for selective assembly of storage battery electrode groups, comprising: a casing; a sorting drum installed vertically in the center of said casing and being intermittently turned by a drive from one sorting position to another; posts arranged the periphery of said drum, each post of said sorting drum being provided with a manipulator sliding freely on said post, each manipulator having a catch for fixing said manipulator in an uppermost position on its associated post; an actuating mechanism; a memory unit memory cells interacting with said actuating mechanism, each of said memory cells being made in the form of a group of arms, said arms being controlled by electromagnets of said actuating mechanism and assembled on a vertical axle under each of said posts, the number of groups of arms being equal to that of the groups of sorted articles, and stops, said stops being installed at each sorting position level with the arm corresponding to the position of the sorted group, each of said catches being controlled by any one arm of said memory cells of the memory unit, thereby ensuring distribution of the sorted flat articles in piles around the periphery of said casing at the sorting positions in accordance with associated parameters of said sorted articles; and a control instrument sending a sorting signal via said actuating mechanism to said memory cells.

2. An automatic device according to claim 1, further comprising a grip positioned at an end of the manipulator extending outwardly from said drum, said grip supporting the article to be sorted.

* * * * *